(12) United States Patent
Trier

(10) Patent No.: US 9,177,122 B1
(45) Date of Patent: Nov. 3, 2015

(54) MANAGING SECURE FIRMWARE UPDATES

(71) Applicant: Amazon Technologies, Inc., Reno, NV (US)

(72) Inventor: Stephen Christopher Trier, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 321 days.

(21) Appl. No.: 13/928,289

(22) Filed: Jun. 26, 2013

(51) Int. Cl.
*H04L 29/06* (2006.01)
*G06F 21/10* (2013.01)

(52) U.S. Cl.
CPC ..................................... *G06F 21/10* (2013.01)

(58) Field of Classification Search
CPC .......... G06F 9/445; G06F 21/10; H04L 29/08
See application file for complete search history.

(56) References Cited

U.S. PATENT DOCUMENTS

| | | | |
|---|---|---|---|
| 6,236,586 B1* | 5/2001 | Morisaki | 365/74 |
| 6,370,603 B1* | 4/2002 | Silverman et al. | 710/72 |
| 2005/0105055 A1* | 5/2005 | Olson et al. | 353/30 |
| 2006/0226950 A1* | 10/2006 | Kanou et al. | 340/5.61 |
| 2007/0129813 A1* | 6/2007 | Ferchau | 700/1 |
| 2009/0172639 A1* | 7/2009 | Natu et al. | 717/120 |
| 2010/0127856 A1* | 5/2010 | Sipple | 340/540 |
| 2013/0269011 A1* | 10/2013 | Wilson | 726/6 |

* cited by examiner

*Primary Examiner* — Carl Colin
*Assistant Examiner* — Muhammad Chaudhry
(74) *Attorney, Agent, or Firm* — Kilpatrick Townsend & Stockton LLP

(57) ABSTRACT

Techniques for managing secure data transfer, including firmware updates and/or cryptographic keys, may be provided. For example, a portable device may be provided that includes at least a first memory configured to store data associated with secure firmware updates while the device is interacting with a second device. In some examples, a network connection with a third device may be established. The data associated with the firmware update may be received from the third device by utilizing the established network connection. Further, in some examples, the received data may be stored in the first memory only while the first device is interacting with the second device. The portable device may also enable a firmware update of the second device based at least in part on the data stored in the first memory.

24 Claims, 6 Drawing Sheets

MANAGING SECURE FIRMWARE UPDATES

BACKGROUND

As network-based computing becomes more and more prevalent, increasingly large amounts of data are stored in data centers. For example, a data center may store information associated with individual processes and/or enterprise solutions. As such, security concerns for the data of the data centers will likely continue and may even increase. However, some devices like servers or the like may execute based on firmware that is updatable. For example, new versions of firmware may enable particular pieces of hardware to operate utilizing new technologies and/or techniques. However, in some cases, appropriate firmware versions may be protected or otherwise stored within data centers not directly connected to the hardware devices for which they may update and it may be desired that such firmware not leave the data centers in an unprotected fashion. As such, managing the security of proprietary data such as firmware updates may pose challenges to developers and/or content providers.

BRIEF DESCRIPTION OF THE DRAWINGS

Various embodiments in accordance with the present disclosure will be described with reference to the drawings, in which.

DETAILED DESCRIPTION

Figure 1:
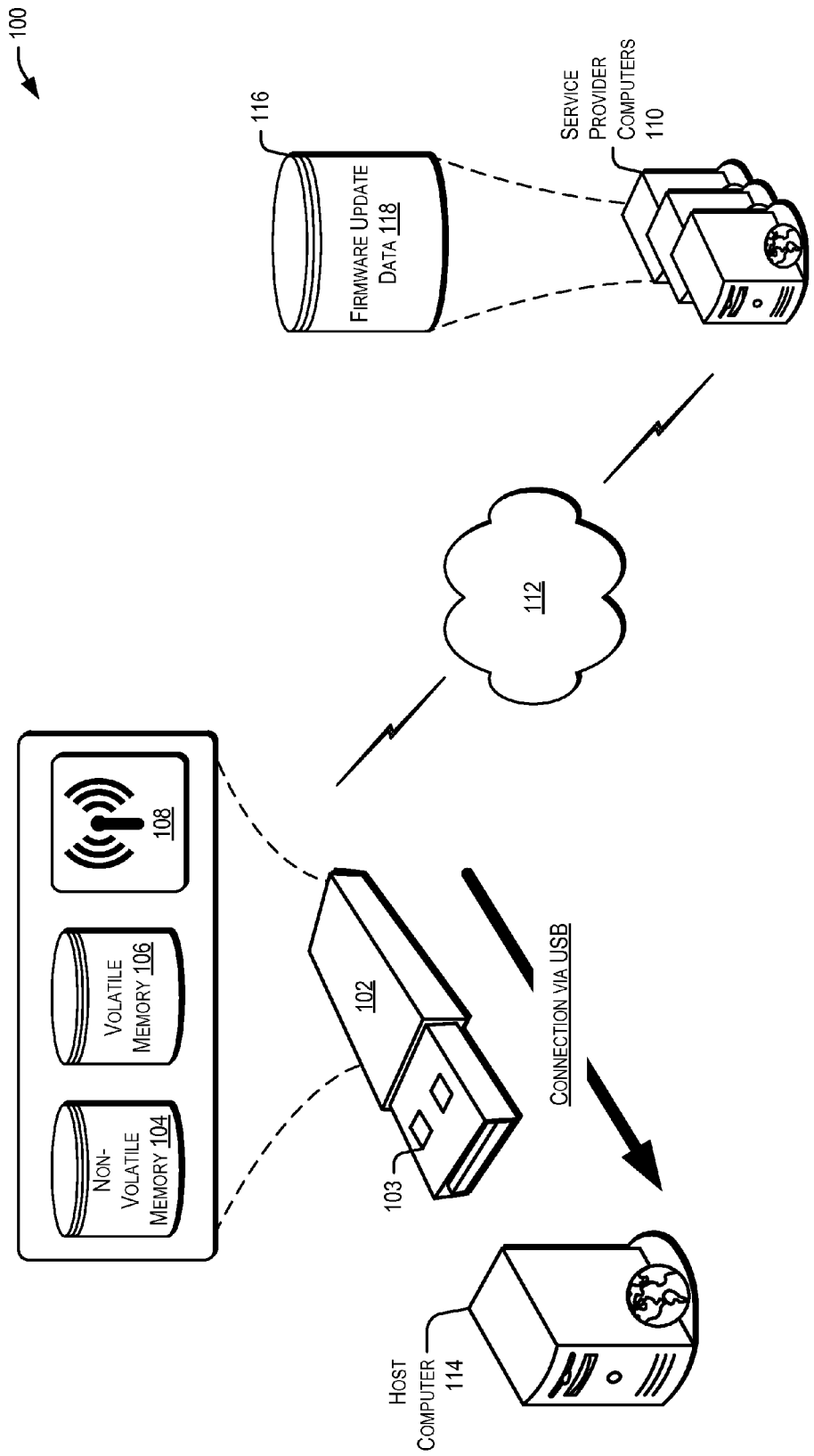
FIG. 1 illustrates an example environment for implementing the management of secure firmware updates described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing secure firmware updates, managing secure block storage transfer, and/or managing the distribution of secure cryptographic information. In some examples, firmware updates may include instructions for updating the firmware of a particular hardware device (e.g., a network interface card, a router, a switch, a video card, etc.) associated with a server or other computing device. For example, certain hardware devices may have their firmware (i.e., software for configuring hardware) updated prior to booting up the hardware, a controller, or one or more processors configured to manage or control the hardware. In other words, in some examples, it may be desired to update the firmware of a particular piece of hardware before implementing the operating system (OS) of the hardware or processors associated with the hardware. For example, in one non-limiting example, the firmware of a network interface card (e.g., of a server) may be out of date or otherwise inoperable. However, the server may not be able to boot up without successful operation of the network interface card. As such, it may be desired to update the firmware of the network interface card prior to booting the OS. In this example, one technique for updating the firmware would be to utilize a USB drive. However, the firmware provider may not want to allow the firmware information to be accessible outside of the data center in which it is stored (other than to the device being updated) and/or the firmware provider may want to ensure that only the most current and/or newest versions are used for updating firmware. As such, it may be possible to continue USB update of firmware and at the same time eliminate USB drives from the data center. In this way, only the host computers (e.g., the hardware devices to be updated or the computers that control the hardware devices to be updated) may have access to the secure firmware update information.

In some examples, the management of secure firmware updates may be implemented by a handheld portable device configured with a connector (e.g., a universal serial bus (USB) connector, a Firewire connector, a Thunderbolt connector, an external serial AT Attachment (eSATA) connector, or the like), multiple sets and/or types of memory, and/or a network interface card. The network interface card may be configured for wireless or Ethernet connection to a public network (e.g., the Internet) or a private network (e.g., a local area network). The USB connector may be configured to communicatively connect to the host computer for data transmission and/or for reception of power from the host computer. In other words, in some examples, the portable device may not be operable without power from the host. Additionally, in some examples, the portable device may include some flash memory or other non-volatile memory for storing an OS, other software for operating the portable device or its hardware (e.g., the network interface card described above), and/or for storing device-specific information such as, but not limited to, a media access control (MAC) address, an IP address, authentication information (e.g., keys, etc.), etc. Other data may also be stored in the flash or other non-volatile memory as desired. Further, in some examples, the portable device may include one or more volatile memory storage devices or locations. For example, the network interface may have its own volatile memory for caching or otherwise storing packet and/or protocol information associated with network data packets received or provided by the network interface. Further, a second volatile memory may be included for storing the received firmware update information (e.g., the new firmware update itself), the data blocks to be transferred, and/or the cryptographic information. As such, as described in further detail below, when a connection between the portable device and the host computer is terminated (e.g., the USB drive is removed from the host), the data stored in the second volatile memory (and/or the volatile memory that enables the network interface) may be erased, destroyed, deleted, dereferenced, or otherwise made inaccessible. In some examples, the volatile memory may lose all trace of the data when power is removed, thus enabling a secure erase of the data.

Additionally, in some examples, when the portable device is attached (via USB) to the host computer the firmware of which is to be updated, the network interface of the portable device may be configured to establish a network connection with a data center or other service provider computers (e.g., that may securely store or otherwise manage the firmware updates). Once connected, and after authentication in some examples, the portable device may receive the firmware update from the data center or service provider. The firmware update may be stored in a local volatile memory (e.g., the second volatile memory that is not associated with the network interface) of the portable device and/or subsequently provided to the host computer for updating the firmware of one or more hardware devices of the host. As such, the portable device may enable the host to update the firmware of its hardware components. As noted above, in some examples, once disconnected from the host, the portable device may lose the firmware update that was stored in the volatile memory.

This brief introduction is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many. For example, the volatile memory described herein may be referred to as random access memory (RAM); however any volatile memory that would not maintain data stored therein once unplugged from a host and/or power would be appropriate.

FIG. 1 depicts an illustrative environment 100 with which techniques for managing secure firmware updates may be described. In illustrative environment 100, a portable USB device 102 may be provided for managing secure firmware updates, managing secure block data transfer, and/or managing cryptographic information uploading. In some examples, the portable USB device 100 may be configured with a USB connector 103, a non-volatile memory 104, a volatile memory 106, and/or a network interface card (or other network interface device) 108. The network interface card 108 may be configured for wireless connections and/or wired connections with one or more service provider computers 110 (e.g., those of a data center or other provider of information) over one or more networks 112. In some examples, the portable USB device 102 may also include one or more processors and/or controllers as well as additional volatile memory (e.g., as part of the network interface card 108 or for caching). The portable USB device 102 may also be configured to receive power from a host computer 114 via the USB connector 103 and/or act as a mass storage device for the host computer 114.

As desired, the service provider computers 110 may include one or more data stores 116 for storing firmware update data 118. The firmware update data 118 may include firmware updates for various hardware devices (e.g., associated with the host computer 114 or other computing systems) and/or various versions for each firmware update. For example, a particular hardware device may be updatable with any version of a particular type of firmware. As such, the data store 116 may manage multiple different versions of the same firmware and/or may indicate which version is the most current or newest. In this way, hardware devices may be updated with the newest firmware or may be rolled back to an older firmware if appropriate.

In some examples, the portable USB device 102 may be configured to act as a gateway for providing secure firmware updates to hardware components of the host computer 114 without storing the firmware updates while disconnected from the host computer 114. In other words, the portable USB device 102 may not store the firmware update data 118 while the portable USB device is "portable;" instead, in some examples, the portable USB device 102 may only store the firmware update data 118 while connected to the host computer 114. Additionally, in some examples, the firmware updates may be stored in the volatile memory 106 as opposed to other volatile memory locations of the portable USB device 110 (e.g., volatile memory used as a general cache for the device and/or volatile memory used for storing network interface card 108 data such as, but not limited to, packet protocol information or the like). Instead, the volatile memory 106 may be used almost exclusively for storing the firmware updates. As such, once the portable USB device 102 is disconnected from the host computer 114, and power is no longer provided to the portable USB device 102, the firmware updates may no longer be accessible. In some examples, enabling the firmware update data 118 that is temporarily stored in the volatile memory 106 to be rendered inaccessible may include, but is not limited to, deleting the firmware updates, dereferencing the firmware updates, and/or altering the firmware update information such that is not usable.

As noted, in some examples, the portable USB device 102 may also be configured to be authenticated with or receive authentication information from the service provider computers 110. Once authenticated, the portable USB device 102 may be able to receive the firmware updates or other secure data from the service provider computers 110 via the networks 112 and store the firmware updates in the volatile memory 106. In this way, the firmware updates may only be stored while the portable USB device 102 is being powered by the host computer 114 or other computing device that provides power. While connected to (or at least during a single connection session with) the host computer 114, the portable USB device 102 may then enable various hardware components of the host computer 114 to be updated by providing the firmware updates to the host computer 114. In this way, the firmware updates remain either stored securely in the data stores 116, temporarily stored in the volatile memory 106 while connected to the host computers 114, and/or stored by the host computers 114 themselves (e.g., once provided via the USB connection).

Additionally, in some examples, the non-volatile memory 104 may be configured to store software for operating the portable USB device 102, identification information of the portable USB device 102 (e.g., a MAC address or other unique identifier), and/or authentication information of the portable USB device 102 (e.g., a private or public key). In some examples, the identification information may be utilized for receiving authentication information and/or as authentication information. In other words, in some cases, the MAC address or other unique identifier and/or an IP address associated with the host computer 114 and/or the portable USB device 102 may be provided to the service provider computers 110 as an indication of the identity of the portable USB device 102. If the service provider computers 110 identify the portable USB device 102 as being on a white list or not being on a black list, the service provider computers 110 may then provide the firmware updates. In this way, the unique identifier of the portable USB device 102 may act as the authentication information for accessing the secure firmware updates. However, in other examples, the MAC address of the portable USB device 102 may indicate to the service provider computers 110 or another authentication computer that the portable USB device 102 should receive authentication credentials. In this case, the authentication computer or a computer associated with the service provider computers 110 may then provide authentication credentials to the portable USB device 102. The portable USB device 102 may then utilize the authentication credentials to access the firmware updates from the service provider computers 110. While reference is made throughout to the portable USB device 102, it should be understood any connector-type may be used for implementing the features described herein. As such, the device 102 could easily be described throughout, without parting from the intent of the disclosure, as a portable Firewire device 102, a portable Thunderbolt device 102, a portable eSATA device 102, or the like.

Figure 2:
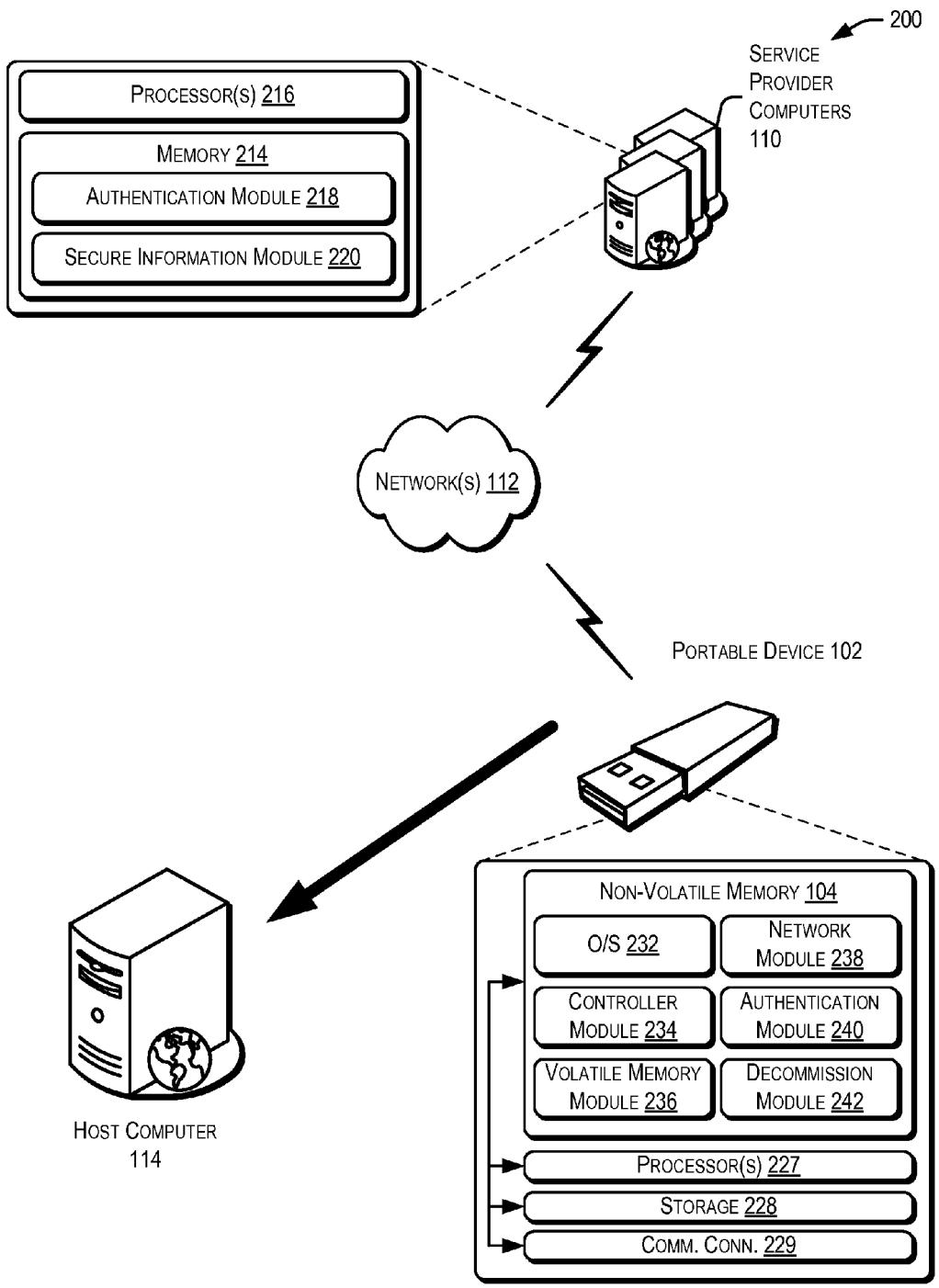
FIG. 2 illustrates an example architecture for implementing the management of secure firmware updates described herein that includes at least one host computer, a portable firmware update device, and/or one or more data center computers connectable via one or more networks with the portable firmware update device, according to at least one example.

FIG. 2 depicts an illustrative system or architecture 200 in which techniques for managing secure firmware updates may be implemented. In architecture 200, a portable USB device 102 may be configured to establish a USB connection 202 with a host computer 114 for updating firmware of various hardware components of the host computer 114 with firmware update data stored or otherwise managed by the service provider computers 110 as shown in FIG. 1. As noted above, upon connection 202, the host computer 114 may provide electrical power to the portable USB device 102 via the USB connection 202. Once powered, the portable USB device 102 may establish a network connection with the service provider computers 110 via the one or more networks 112.

In some examples, the networks 112 may include any one or a combination of many different types of networks, such as cable networks, the Internet, wireless networks, cellular networks and other private and/or public networks. While the illustrated example represents the portable USB device 102 accessing the service provider computers 110 over the networks 112, the described techniques may equally apply in instances where the portable USB device 102 interacts with the service provider computers 110 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

In some aspects, the one or more service provider computers 110 may, in some examples, provide computing resources such as, but not limited to, client entities, low latency data storage, durable data storage, data access, management, virtualization, cloud-based software solutions, electronic content performance management, etc. The one or more service provider computers 110 may also be operable to provide web hosting, computer application development, and/or implementation platforms, combinations of the foregoing, or the like to one or more users or other entities. The one or more service provider computers 110, in some examples, may provide secure data management including, but not limited to, storing firmware updates and/or cryptographic information.

As described briefly above, portable USB device 102 may allow the host computers 114 to interact with or otherwise receive secure data from the service provider computers 110, such as to update firmware of appropriate hardware components and/or to enable storage of cryptographic keys for secure booting. The one or more service provider computers 110, perhaps arranged in a cluster of servers or as a server farm, may host applications and/or cloud-based software services. Other server architectures may also be used to host the cloud-based software services.

The service provider computers 110 may be any type of computing device such as, but not limited to, a server, a mobile phone, a smart phone, a personal digital assistant (PDA), a laptop computer, a desktop computer, a thin-client device, a tablet PC, an electronic book (e-book) reader, etc. In some examples, the service provider computers 110 may be able to communicate with the portable USB device 102 via the networks 112, or via other network connections. Additionally, the service provider computers 110 may be part of a distributed system. Additionally, it should be noted that in some embodiments, the service provider computers are executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. The service provider computers 110 may include one or more servers, perhaps arranged in a cluster, as a server farm, or as individual servers not associated with one another. These servers may be configured to implement the content performance management described herein as part of an integrated, distributed computing environment.

In one illustrative configuration, the service provider computers 110 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described.

The memory 214 may store program instructions that are loadable and executable on the processor(s) 216, as well as data generated during the execution of these programs. Depending on the configuration and type of the service provider computers 110, the memory 214 may be volatile (such as random access memory (RAM)) and/or non-volatile (such as read-only memory (ROM), flash memory, etc.). The service provider computer 110 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least an authentication module 218 and/or a secure information module 220. In some example, the authentication module 218 may be configured to authenticate the portable USB device 102 and/or requests from the portable USB device 102. In some examples, as noted above, the authentication module 218 may determine, based at least in part on a MAC address or IP address associated with the portable USB device 102, that the portable USB device 102 is authorized to access the requested firmware update or cryptographic keys. In which case, the authentication module 218 may indicate to the secure information module 220 that secure information may be provided to the portable USB device 102. In other examples, however, the MAC or IP address of the portable USB device 102 may be utilized by the authentication module 218 to identify that authentication credentials may be provided to the portable USB device 102. In this case, the authentication module 218 may provide the credentials to the portable USB device 102, and the portable USB device 102 may then utilize the credentials to access the secure content from the secure information module 220. As implied, the secure information module 220 may be configured to manage the secure information (e.g., the firmware updates and/or the cryptographic keys). Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user provided response to a security question or a geographic location obtained by the portable USB device 102.

In some aspects, the portable USB device 102 may also be any type of computing devices such as, but not limited to, a USB drive, a mobile phone, a smart phone, a personal digital assistant (PDA), a laptop computer, a desktop computer, a server computer, a thin-client device, a tablet PC, etc. In some examples, the portable USB device 102 may be in communication with the host computers 114 via the USB connection and/or the service provider computers 110 via the networks 112, or via other network connections. The portable USB device 102 may also include geo-location devices (e.g., a global positioning system (GPS) device or the like) for providing and/or recording geographic location information associated with the portable USB device 102

In one illustrative configuration, the portable USB device 102 may include at least one non-volatile memory 104 and one or more processing units (or processor(s)) 227. The processor(s) 227 may be implemented as appropriate in hardware, computer-executable instructions, firmware, or combinations thereof. Computer-executable instruction or firmware implementations of the processor(s) 227 may include computer-executable or machine-executable instructions written in any suitable programming language to perform the various functions described.

The non-volatile memory 104 may store program instructions that are loadable and executable on the processor(s) 227, as well as data generated during the execution of these programs, and/or unique identifiers of the portable USB device 102 (e.g., MAC address, etc.). Depending on the configuration and type of portable USB device 102, the non-volatile memory 104 may be read only memory (ROM), flash memory, or the like. The portable USB device 102 may also include additional storage 228, which may include removable storage and/or non-removable storage (e.g., the volatile memory 106 discussed with reference to FIG. 1). The additional storage 228 may include, but is not limited to, random access memory (RAM), magnetic storage, optical disks and/or tape storage. The disk drives and their associated computer-readable media may provide non-volatile storage of computer-readable instructions, data structures, program modules and other data for the computing devices. In some implementations, the non-volatile memory 104 may include multiple different types of non-volatile memory. Additionally, the volatile memory 106 may include, but is not limited to, RAM, parallel random access memory (PRAM), static random access memory (SRAM), dynamic random access memory (DRAM), synchronous dynamic random access memory (SDRAM), or other memory technology.

The non-volatile memory 104, the additional storage 228, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The non-volatile memory 104 and the additional storage 228 are all examples of computer storage media. Additional types of computer storage media that may be present in the portable USB device 102 may include, but are not limited to, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the portable USB device 102. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The portable USB device 102 may also contain communications connection(s) 229 (e.g., the USB connector 103 as shown in FIG. 1) that allow the portable USB device 102 to communicate with the host computer 114, a stored database, another computing device or server, user terminals, and/or other devices on the networks 112. Turning to the contents of the non-volatile memory 104 in more detail, the non-volatile memory 104 may include an operating system 232 and/or one or more application programs or services for implementing the features disclosed herein including a controller module 234, a volatile memory module 236, a network module 238, an authentication module 240, and/or a device decommissioning module 242. In some examples, the controller module 234 may be configured to control the operations of the portable USB device 102 (e.g., establishing USB connections, managing power, sending and/or receiving data requests between the host computer 114 and the service provider computers 110, storing the secure data in the volatile memory 106, and/or activating one or more of the other modules 236, 238, 240, 242). In some examples, the OS 232 and the controller module 234 may work together to control the portable USB device 102.

In some examples, the volatile memory module 236 may be configured to manage temporary storage of the secure information (e.g., firmware updates, data blocks, computer images, and/or cryptographic keys) from the service provider computers 110. Additionally, in some examples, the volatile memory module 236 may also be configured to manage block data storage for downloading the block data to the portable USB device 102 or for uploading the block data from the portable USB device 102 to the service provider computers 110. In this way, the portable USB device 102 may also act a gateway for backing up or otherwise storing entire blocks or images of data from the host computer 114 to a storage service of the service provider computers.

Additionally, as noted, the volatile memory module 236 may be utilized by the portable USB device 102 to provide the firmware update information from the service provider computers 110 to appropriate hardware components of the host computer 114. In this way, data center security (e.g., of the service provider computers 110) may be maintained while potentially eliminating USB flash drives from the data center. Additionally, in some examples, the volatile memory module 236 may be configured to store the newest version of firmware for each particular hardware component, thus ensuring that updates are always done with the most recent version and no older versions are inadvertently floating around on flash drives. In some examples, the volatile memory 106 managed by the volatile memory module 236 may be large or small. If small, it be used as scratch space, or to cache a portion of the blocks retrieved from the data center of the service provider computers 110 to improve performance. If large enough, however, the volatile memory 106 may be able to store an entire file system image read from the data center. If desired, the volatile memory 106 may also be used to mimic a writeable drive while operating from a read-only file server, by storing data written by the host computer 114 in RAM without forwarding that data to the service provider computers 110.

Additionally, in some examples, the volatile memory module 236 may be configured to manage credentials used to access the service provider computers 110. However, in other examples, the credentials may be stored in the non-volatile memory 104. Additionally, in some examples, the volatile memory module 236 may be configured to store cryptographic information provided by the service provider computers 110. For example, some computing devices may include "secure boot," "trusted boot," or "verified boot" features to verify the integrity of an OS, a bootloader, and/or a basis input/output system (BIOS) file. In some examples, these features may be implemented by using cryptographic keys stored in the non-volatile memory 104. If tampering with the OS or other software is detected, the computing device may operate in a degraded mode or might refuse to boot at all. In this case, the cryptographic keys that could enable the special boot features may be requested and/or received by the portable USB device 102 from the service provider computers 110.

In some examples, the network module 238 may be configured to establish one a wireless or wired network connection with one or more other computing devices via the networks 112. Specifically, the network module 238 may establish a connection with the service provider computers 110 or other computing devices capable of providing firmware updates and/or cryptographic keys. Additionally, in some examples, the authentication module 240 may be configured to provide, receive, and/or manage authentication credentials for the portable USB device 102. For example, the authentication module 240 may be configured to manage storage of any credentials in at least a portion of the non-volatile memory 104 of the portable USB device 102. While this may risk the leak of the credential information if the portable USB device 102 leaves the data center (e.g., of the service provider computers 110), the service provider computers 110 may be configured to restrict use of the credentials to a specific WiFi or Ethernet network (or to a specific MAC address) so that the credentials may not be utilized by a rogue device or the like. Further, in some examples, the credentials could be retrieved by the portable USB device 102 at startup via a network boot protocol such as Dynamic Host Configuration Protocol (DHCP) or via a Preboot Execution Environment (PXE), and then stored in the volatile memory 106. As such, the credentials may be erased or otherwise dereferenced when power is no longer supplied to the portable USB device 102. Further, in some examples, the device decommission module 242 may be configured to erase or otherwise decommission a portable USB device 102 based at least in part on information indicating that the portable USB device 102 has been stolen or otherwise compromised. The device decommission module 242 may be configured to erase all data of the portable USB device 102 (including non-volatile memory 104) and/or to send unique identifier information associated with the portable USB device 102 to the service provider computers 110 for updating a revocation list or the like.

A few additional examples of the operations of the portable USB device 102 are also described in greater detail below with reference to FIGS. 3-6.

Figure 3:
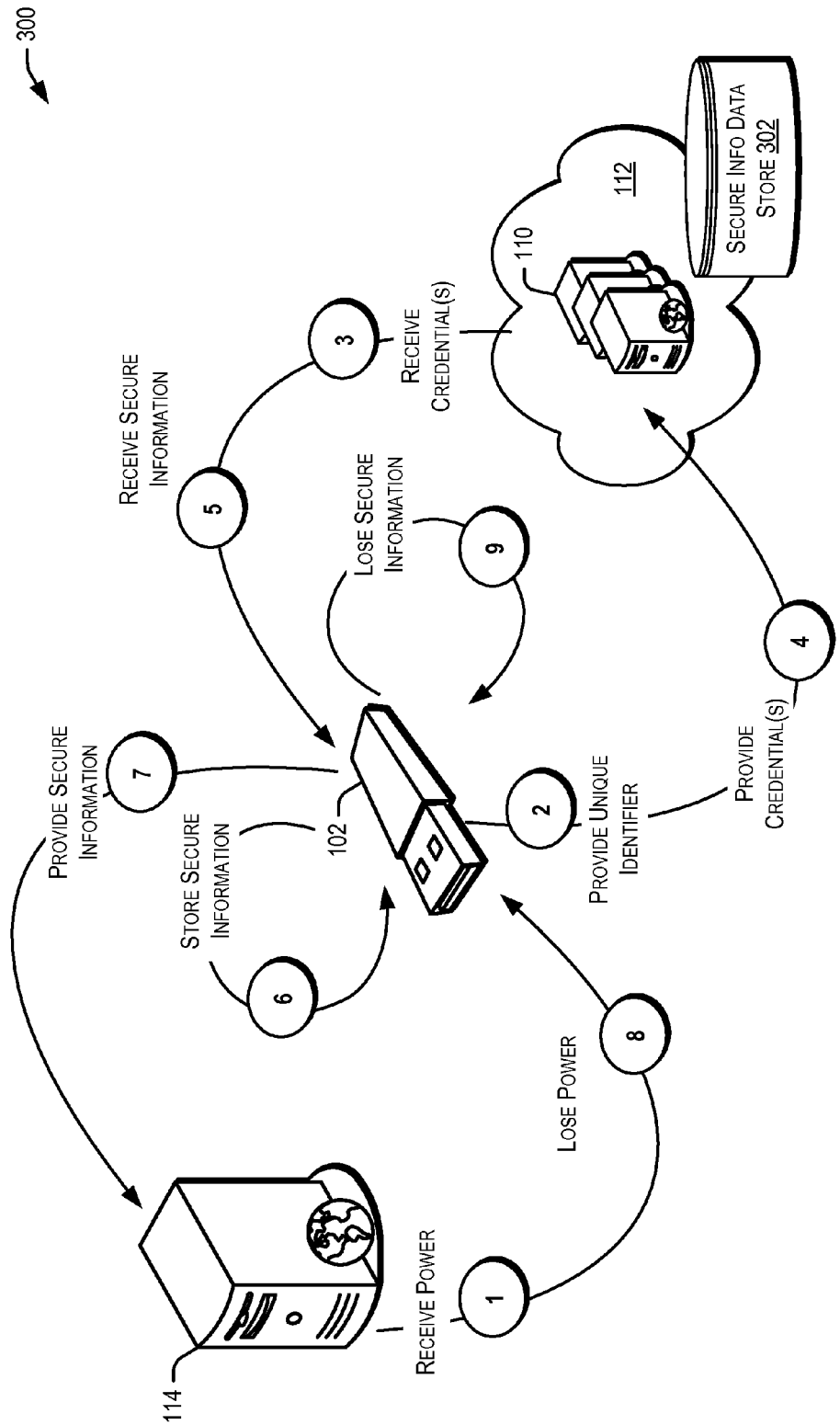
FIG. 3 illustrates an example block diagram for describing the management of secure firmware updates described herein, according to at least one example.

FIG. 3 illustrates an example flow diagram showing one or more techniques 300 for securely updating firmware, as described herein. While techniques 300 are shown in FIG. 3 in a particular order (including arbitrary sequence numbers), it should be understood that no particular order is necessary and that one or more steps or parts of the techniques 300 may be omitted, skipped, and/or reordered. In at least one non-limiting example, the portable USB device 102 described above with respect to FIGS. 1 and 2 may receive power from a host computer 114 via a USB connection. In some examples, the power received by the host computer 114 may enable processors and/or a network interface card of the portable USB device 102 to operate at least in order to store firmware updates and/or cryptographic information in a volatile memory of the portable USB device 102. In some aspects, the portable USB device 102 may then be configured to provide a unique identifier to a data center or the service provider computers 110 described above with respect to FIGS. 1 and 2. As noted, in some examples, the service provider computers 110 may be associated with or otherwise control a data store 116 configured to store secure information 302 (e.g., firmware updates or other data requested by the host computer 114 through the portable USB device 102).

In some examples, the portable USB device 102 may receive authentication credentials from the service provider computers 110 at least in response to the unique identifier. The portable USB device 102 may then provide the authentication credentials to the service provider computers 110 or to another set of computers. In response to the portable USB device 102 being authenticated based at least in part on the authentication credentials, the portable USB device 102 may then receive the secure information from the service provider computers 110. The portable USB device 102 may then be configured to store the secure information in a volatile memory of the portable USB device 102. Once stored temporarily in the volatile memory of the portable USB device 102, the portable USB device 102 may provide the secure information to the host computer 114 (at least in some examples, enabling a firmware update of particular hardware components of the host computer 114). At least at some point after the host computer 114 has updated the firmware of the appropriate hardware devices, the portable USB device 102 may lose power by being disconnected from the host computer 114 (such as by a user or other entity removing the portable USB device 102 from the USB connector of the host computer 114). Based at least in part on the loss of power, the portable USB device 102 may lose the secure information (e.g., the volatile memory may be deleted, dereferenced, or otherwise rendered inaccessible).

Figure 4:
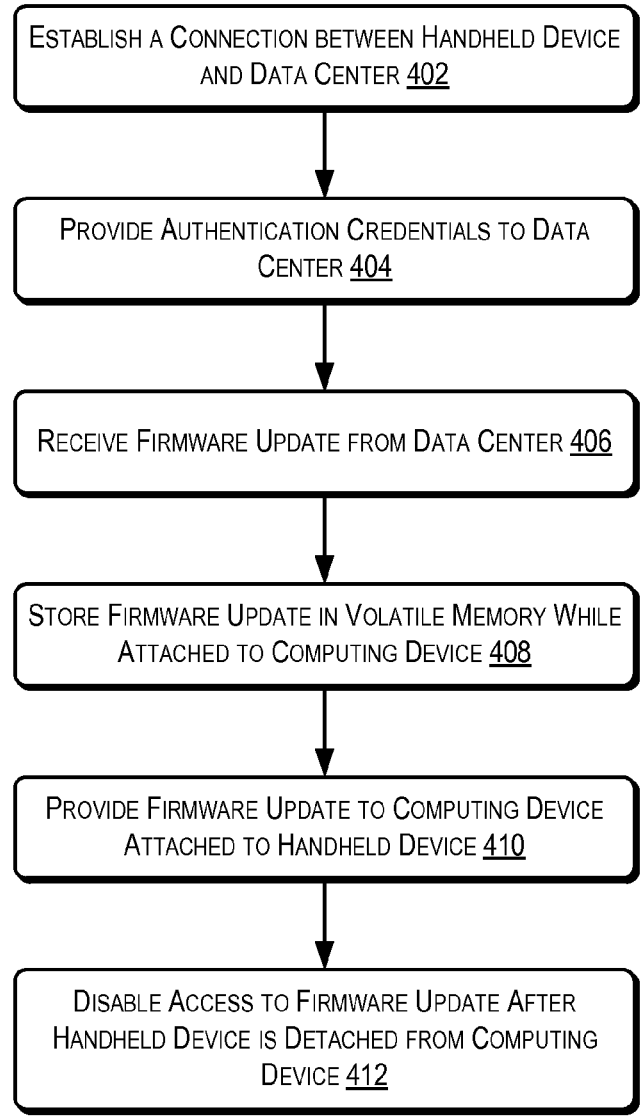
FIG. 4 illustrates an example flow diagram of a process for describing implementation of the management of secure firmware updates described herein, according to at least one example.
Figure 5:
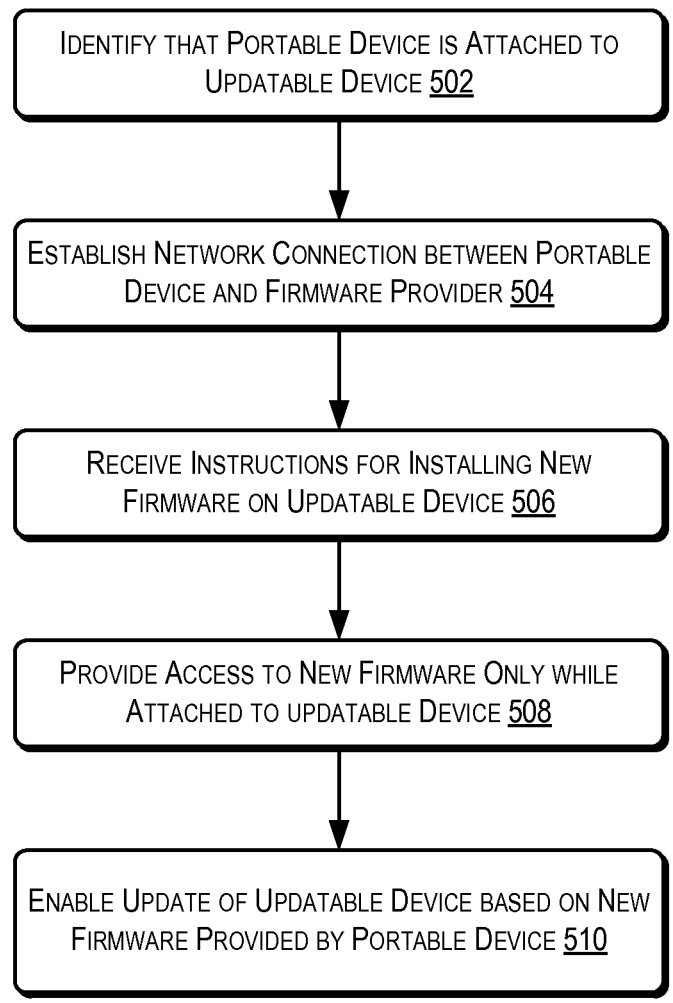
FIG. 5 illustrates another example flow diagram of a process for describing implementation of the management of secure firmware updates described herein, according to at least one example.

FIGS. 4 and 5 illustrate example flow diagrams showing respective processes 400 and 500 for managing secure firmware updates, according to at least a few examples. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the portable USB device 102 (e.g., utilizing at least one of the volatile memory module 236, the network module 238, and/or the authentication module 240) shown in FIG. 2 may perform the process 400 of FIG. 4. The process 400 may begin at 402 by including establishing a connection between the portable USB device 102 and a data center (e.g., associated with the service provider computers 110 of at least FIG. 1). At 404, the process 400 may include providing authentication credentials to the data center. The authentication credentials may be a public or private key, or the credentials may be a unique identifier associated with the portable USB device 102 (e.g., the MAC address, and IP address, WiFi network information, and/or Ethernet network information). Additionally, in some examples, the process 400 may include receiving firmware update information from the data center at 406. The firmware update information may include the firmware update itself or information associated with the firmware update such as, but not limited to, a version number or the like. At 408, the process 400 may include storing the firmware update in volatile memory of the portable USB device 102 while the portable USB device 102 is attached to the host computing device. At 410, the process 400 may include providing the firmware update information to the computing device attached to the portable USB device 102. Further, at 412, the process end by including disabling access to the firmware update information stored in the volatile memory after the portable USB device 102 is detached from the host computing device.

FIG. 5 illustrates an example flow diagram showing process 500 for managing secure firmware updates, according to at least a few examples. The portable USB device 102 (e.g., utilizing at least one of the volatile memory module 236, the network module 238, and/or the authentication module 240) shown in FIG. 2 may perform the process 500 of FIG. 5. The process 500 may begin at 502 by including identifying that a portable device (e.g., the portable USB device 102 of FIGS. 1 and 2) is attached to an updatable device (e.g., the host computer 114 of FIGS. 1 and 2). At 504, the process 500 may include establishing a network connection between the portable device and a firmware provider (e.g., the service provider computers 110 of FIGS. 1 and 2). Additionally, in some examples, the process 500 may include receiving instructions for installing new firmware update on the updatable computing device at 506. In some aspects, at 508, the process 500 may include providing access to the new firmware information only while the portable device is attached to the updatable device. Further, at 510, the process 500 may end by including enabling an update of the updatable device based at least in part on new firmware provided by the portable device.

Illustrative methods and systems for managing secure firmware updates are described above. Some or all of these systems and methods may, but need not, be implemented at least partially by architectures such as those shown at least in FIGS. 1-5 above.

Figure 6:
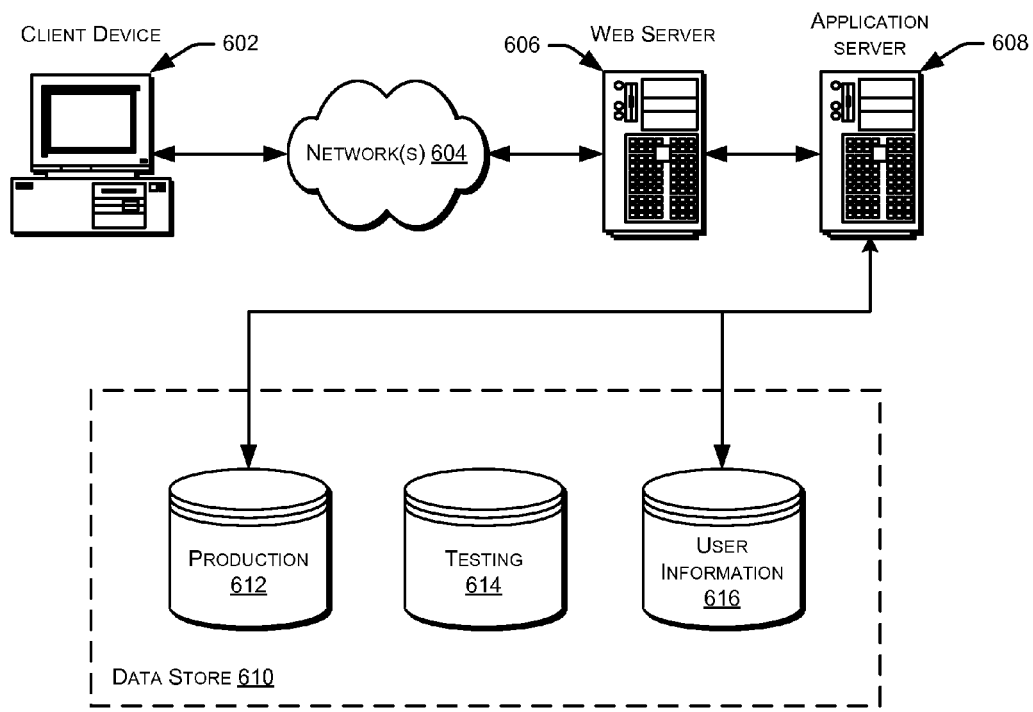
FIG. 6 illustrates an environment in which various embodiments of the management of electronic content performance described herein can be implemented, according to at least one example.

FIG. 6 illustrates aspects of an example environment 600 for implementing aspects in accordance with various embodiments of this disclosure. As will be appreciated, although a Web-based environment is used for purposes of explanation, different environments may be used, as appropriate, to implement various embodiments of this disclosure. The environment 600 may include an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment 600 may also include at least one application server 608 and a data store 610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 602. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A portable device for managing secure firmware updates, comprising:
    a non-volatile memory that stores computer-executable instructions;
    a first volatile memory configured to store firmware update data associated with the secure firmware updates;
    a network interface device with a second volatile memory configured to store protocol packet information associated with the secure firmware updates; and
    a processor configured to access the non-volatile memory, wherein the processor is configured to execute the computer-executable instructions, while the portable device is interacting with an updatable computing device, to collectively at least:
    enable reception of power, from the updatable computing device, for operating the portable device while interacting with the updatable computing device;
    establish a network connection, via the network interface device, with a data center computing device;
    receive the firmware update data from the data center computing device in response to an instruction to update firmware of the updatable computing device;
    store the firmware update data in the first volatile memory only while the portable device is interacting with the updatable computing device;
    provide the firmware update data stored in the first volatile memory to the updatable computing device based at least in part on the instruction to update the firmware of the updatable computing device; and
    remove the power from the first volatile memory to destroy content of the firmware update data.

2. The portable device of claim 1, further comprising a connector for interacting with the updatable computing device, the connector comprising a universal service bus (USB) connector, a Firewire connector, a Thunderbolt connector, or an eSATA connector.

3. The portable device of claim 2, wherein the connector is configured to enable the reception of the power from the updatable computing device.

4. The portable device of claim 1, wherein the first volatile memory is configured as static random access memory (SRAM) or dynamic random access memory (DRAM).

5. The portable device of claim 1, wherein the data center computing device includes at least a server configured to securely store the firmware update data for updating the updatable computing device.

6. A first device for managing a secure firmware update, comprising:
    a first volatile memory configured to store data associated with the secure firmware update while the first device is interacting with a second device;
    a processor configured to access computer-executable instructions of a second memory of the first device, wherein the processor is configured to execute the computer-executable instructions to collectively at least:

establish a network connection with a third device via a network interface of the first device, the network interface having a third memory for enabling the network interface;

receive the data from the third device utilizing the network connection;

store the received data in the first volatile memory only while the first device is interacting with the second device;

enable a firmware update of the second device based at least in part on data stored in the first volatile memory; and disable access to the data after the first device is detached from the second device.

7. The first device of claim 6, wherein the data associated with the secure firmware update comprises instructions for a most current firmware update for the second device.

8. The first device of claim 6, wherein the data associated with the secure firmware update comprises an authentication credential for enabling access of a most current firmware update for the second device.

9. The first device of claim 8, wherein the processor is configured to execute the computer-executable instructions to collectively at least receive the authentication credential from a fourth device based at least in part on an identifier associated with the first device, the fourth device configured to manage credential information for accessing the data from the third device.

10. The first device of claim 9, wherein the identifier associated with the first device comprises a media access control (MAC) address associated with the network interface of the first device or an Internet Protocol (IP) address associated with the first device.

11. The first device of claim 6, wherein the data associated with the secure firmware update comprises a cryptographic key for verifying integrity of at least one of an operating system of the second device, a bootloader of the second device, or a Basic Input/Output System (BIOS) file of the second device.

12. The first device of claim 6, wherein the network connection is established wirelessly, enabling access to the third device independent of a location of the second device.

13. The first device of claim 6, wherein the first volatile memory is configured to store the data associated with the secure firmware update only during a time when the first device is receiving power from the second device or the third device.

14. The first device of claim 13, wherein the power is received from the second device via a connector of the first device, the connector comprising a universal serial bus (USB) connector, a Firewire connector, a Thunderbolt connector, or an eSATA connector.

15. The first device of claim 6, wherein the second device comprises a hardware element capable of being updated based at least in part on the data associated with the secure firmware update.

16. The first device of claim 6, wherein content of the data associated with the secure firmware update is destroyed upon detachment from the second device.

17. The first device of claim 6, wherein the third device comprises a memory configured to securely store a most current firmware update for the second device.

18. A computer-implemented method for managing a secure firmware update, comprising:

under control of one or more computer systems of a handheld device configured with computer-executable instructions, establishing a connection between the handheld device and a data center via a network interface of the handheld device, the network interface having memory capable of enabling the network interface;

based at least in part on the established connection, providing an authentication credential to the data center;

receiving a firmware update from the data center and based at least in part on a successful authentication using the provided authentication credential;

storing the firmware update in a second volatile memory only while the handheld device is attached to a computing device;

providing the firmware update to the computing device attached to the handheld device; and disabling access to the firmware update after the handheld device is detached from the computing device.

19. The computer-implemented method of claim 18, wherein the handheld device is configured to be attached to the computing device utilizing a connector of the handheld device, the connector comprising a universal serial bus (USB) connector, a Firewire connector, a Thunderbolt connector, or an eSATA connector.

20. The computer-implemented method of claim 18, wherein disabling access to the firmware update includes deleting the firmware update or destroying content of the firmware update.

21. One or more non-transitory computer-readable media storing computer-executable instructions for managing a secure firmware update that, when executed by a portable device controller of a portable device, configure the portable device controller to perform operations comprising:

identifying that the portable device is attached to an updatable device;

establishing a network connection between the portable device and a firmware provider via a network interface of the portable device, the network interface configured with network interface memory;

based at least in part on the established connection and a request for new firmware, receiving instructions for installing the new firmware on the updatable device;

providing access to a second volatile memory storing the new firmware only while the portable device is attached to the updatable device;

enabling an update of the updatable device based at least in part on the new firmware provided by the portable device; and disabling access to the new firmware after the portable device is detached from the updatable device.

22. The one or more non-transitory computer-readable media of claim 21, wherein the portable device controller is further configured to perform operations comprising enabling authentication, by the firmware provider, of the portable device prior to receiving the instructions for installing the new firmware.

23. The one or more non-transitory computer-readable media of claim 21, wherein the portable device is configured to be attached to the updatable device utilizing a connector of the portable device, the connector comprising a universal serial bus (USB) connector, a Firewire connector, a Thunderbolt connector, or an eSATA connector.

24. The one or more non-transitory computer-readable media of claim 23, wherein the connector is configured to enable reception, by the portable device, of power from the updatable device.

* * * * *